US011081094B1

(12) United States Patent
Homan

(10) Patent No.: US 11,081,094 B1
(45) Date of Patent: Aug. 3, 2021

(54) VIOLIN/VIOLA WEARABLE SUPPORT

(71) Applicant: Curt Dennis Homan, Fair Oaks, CA (US)

(72) Inventor: Curt Dennis Homan, Fair Oaks, CA (US)

( * ) Notice: Subject to any disclaimer, the term of this patent is extended or adjusted under 35 U.S.C. 154(b) by 0 days.

(21) Appl. No.: 16/781,904

(22) Filed: Feb. 4, 2020

(51) Int. Cl.
*G01G 5/00* (2006.01)
*G10G 5/00* (2006.01)

(52) U.S. Cl.
CPC .................................... *G10G 5/005* (2013.01)

(58) Field of Classification Search
CPC ................................. G10G 5/005; G10G 5/00
See application file for complete search history.

(56) References Cited

U.S. PATENT DOCUMENTS 1,315,015 A 9/1919 Doyle
2,576,018 A 11/1951 Johnson
2020/0143778 A1* 5/2020 Silverman ................ G10D 1/02

FOREIGN PATENT DOCUMENTS

DE 4229934 5/1993
DE 202006019400 3/2007
DE 202007003473 5/2007

* cited by examiner

*Primary Examiner* — Kimberly R Lockett
(74) *Attorney, Agent, or Firm* — Volta Law Group, LLC

(57) ABSTRACT

The wearable support article contains a clamping mechanism, an orienting mechanism, and a support mechanism. These components are combined to support an instrument, such as a viola or violin, when is it being played by a musician. The clamping mechanism attaches the article to the instrument. The orienting mechanism attaches to the clamping mechanism, providing an orientation support platform upon which the clamping mechanism and thus the instrument will be held. The support mechanism of the entire wearable support article provides a loop that is worn by the musician while playing the instrument, and a peg or sleeve attached to the loop allows the instrument to be put up or down at will by the player during a performance.

15 Claims, 2 Drawing Sheets

VIOLIN/VIOLA WEARABLE SUPPORT

TECHNICAL FIELD

This application relates in general to an article of manufacture for providing a wearable support to play a violin or viola.

BACKGROUND

A violinist or violist uses one hand to apply pressure on the strings along the fingerboard atop the neck of the instrument while using the other hand to rub a bow across the strings by the bridge above the body of the instrument. While playing, the musician typically places the chin on a chin rest attached to the upper edge of the lower bouts (large end) of the instrument and grips the instrument between the chin and left shoulder. The degree to which that grip is able to hold the length of the instrument roughly horizontally is the degree to which the left hand is unimpeded in shifting from one position to another along the neck of the instrument. Existing shoulder rests, which attach to the underside of the lower bouts, attempt to fill the space between the player's chin and left shoulder, minimizing the player's need to raise the shoulder. Thus, the longer the player's neck, the taller the shoulder rest need be to fill that space. Because existing shoulder rests do not attach to the player, considerable pressure must still be applied by the chin of the player to keep the instrument from sagging and to free the left hand in shifting along the neck of the instrument. Even short-necked players who do not use shoulder rests must exert pressure with the chin to support the weight of the instrument.

One with common skill in the art would acknowledge that there are at least four problems or limitations associated with current methods for supporting a violin or viola while playing it in a traditional manner, that is, in a manner that maximizes the technical capabilities of the instrument: 1) the constant pressure exerted by the player's chin and neck against the chin rest or the lower end of the instrument abrades the musician's skin, resulting in discoloration, ulceration and even scarring for habitual/professional players; even if such marks are largely cosmetic, they can be quite painful from constant irritation; 2) the aforementioned pressure may cause serious neck or spinal injury in some players, including dislocated or compressed cervical vertebrae and pinched nerves that may cause numbness or partial paralysis in either or both arms; 3) the lower bouts (large end) of the instrument must be within reach of the player's chin, preventing the end of the instrument from being held on the shoulder, where it would give more room to use the bow for those with longer-than-average arms; 4) partial support of the instrument by the left hand impedes the shifting of the hand from one position to another along the neck of the instrument, thus reducing the technical capabilities of the player and possibly causing or contributing to the onset of disorders such as carpal tunnel syndrome or tendonitis.

It should be noted that there are many "fiddlers" who prop the end of a violin or viola against the chest or upper arm while playing; but such a position greatly hampers the technique of the players, who must support the instrument with the left hand alone and are thus unable to shift rapidly up and down the fingerboard without securing one end of the instrument.

The existing limitations/problems in supporting a viola or violin while playing the instrument are addressed by the present invention according to the principles and example embodiments herein.

In accordance with the present invention, the above problems or limitations are solved by providing as an article of manufacture a wearable support to play a violin or viola.

The wearable support article of this invention contains components in three sets, or mechanisms: 1) a clamping mechanism; 2) an orienting mechanism; and 3) a support mechanism. These mechanisms combine to support a violin or viola while it is being played. The clamping mechanism attaches to the lower bouts of the instrument; the orienting mechanism connects the clamping mechanism to the support mechanism, orienting the instrument at a desired platform angle; and the support mechanism provides a rigid loop worn around the player's neck that supports the other mechanisms and the instrument while the latter is being played.

The great utility of this invention is that an article of manufacture may provide a wearable support device whose proper use while playing a violin or viola requires none of the following: the player's chin, a chin rest, a shoulder rest, the player's gripping the instrument between the chin and shoulder, and supporting the instrument by the left hand. In addition, this invention not only allows the player to put the instrument up or down at will during a performance, but also permits positions of the violin or viola while playing it that would be impossible if the instrument were gripped by the chin, positions that may benefit those players with longer or shorter-than-average necks or arms.

The foregoing has outlined rather broadly the features and technical advantages of the present invention in order that the following detailed description of the invention may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantage will be better understood from the following description when considered in connection with the accompanying figures. It is to be expressly understood, however, that each of the figures is provided for the purposes of illustration and description only and is not intended as a definition of the limits of the present invention.

BRIEF DESCRIPTION OF THE DRAWINGS

The illustrations herein are visual aids only and are not intended to be dimensionally accurate representations of the described parts of this invention. Like reference numbers in the drawings represent corresponding parts throughout.

Figure 1:
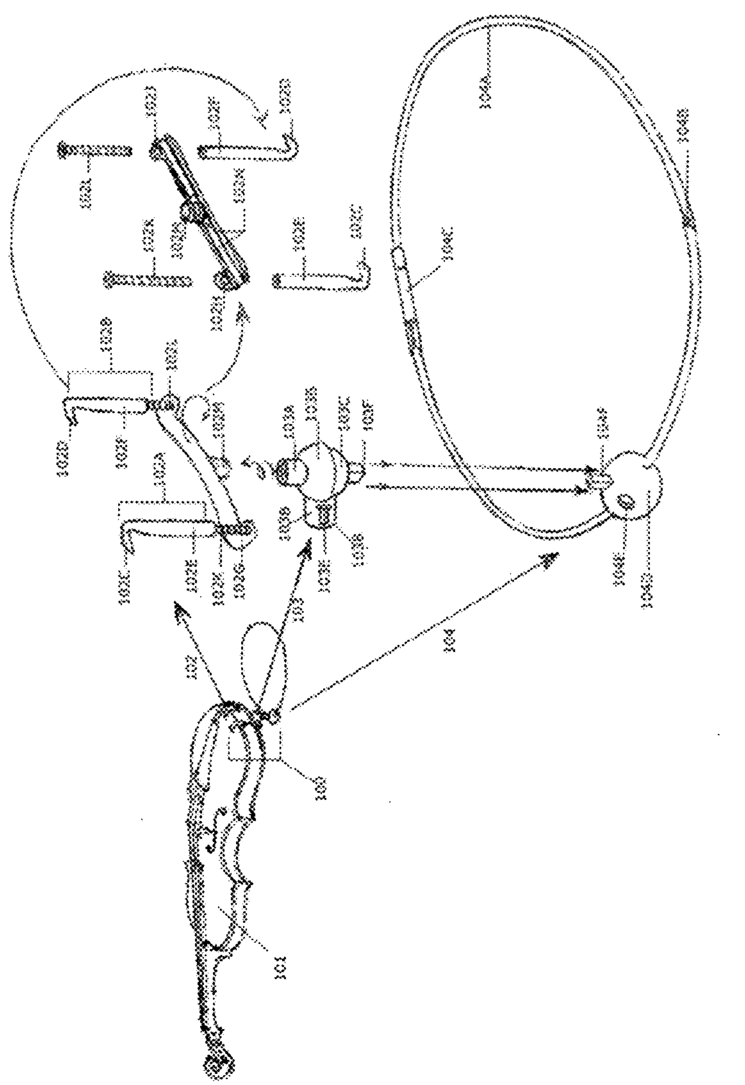
FIG. 1 illustrates one potential embodiment of an article of manufacture for providing a wearable support to play a violin or viola according to the present invention.

This application relates in general an article of manufacture for providing a wearable support to play a viola or violin.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. Thus, for example, reference to "a needle" includes reference to one or more of such needles and "etching" includes one or more of such steps. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps, or components but do not preclude the presence or addition of one or more other features, steps, or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "50-250 micrometers should be interpreted to include not only the explicitly recited values of about 50 micrometers and 250 micrometers, but also include individual values and sub-ranges within the indicated range. Thus, included in this numerical range are individual values such as 60, 70, and 80 micrometers, and sub-ranges such as from 50-100 micrometers, from 100-200, and from 100-250 micrometers, etc. This same principle applies to ranges reciting only one numerical value and should apply regardless of the breadth of the range or the characteristics being described.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill. Further, unless otherwise stated, the term "about" shall expressly include "exactly," consistent with the discussion above regarding ranges and numerical data.

The term "instrument" refers to a viola or violin that is to be played by an individual. The instrument is typically held with one end supported by the individual between a shoulder and chin at a chin support, while the individual holds the neck and fingers the strings.

The term "player" and "musician" refers to an entity, e.g. a human, that operates a device according to the present invention in order to bring about a desired effect or outcome, particularly provide the user an ability to support an instrument. In a particular case, the user is one that is playing a viola or violin. For such a user, the terms "player" and "musician" may be used herein interchangeably.

FIG. 1 depicts one potential embodiment of an article of manufacture for providing a wearable support to play a violin or viola. The wearable support article 100 is constructed of components in three sets, or mechanisms: a clamping mechanism 102, an orienting mechanism 103, and a support mechanism 104. These three mechanisms combine to support an instrument 101 when it is being played and are described below in detail.

The clamping mechanism 102 comprises the following: two upper clamp pieces 102A-102B whose paddle-like heads 102C-102D form slightly acute angles with their tubular and interiorly threaded bodies 102E-102F; a lower clamp piece 102G with two holes 102H-102J; two screws 102K-102L that pass upward through the holes 102H-102J and whose threads are mated to those in the bodies 102E-102F of the upper clamp pieces 102A-102B; a short bolt 102M that slides in a slot 102N running the length of the underside of the lower clamp piece 102G. The two upper clamp pieces enable the clamping mechanism 102 to straddle the "saddle" (a wooden piece set in the middle of the upper edge of the lower end of a violin or viola); thus, the upper clamp pieces are set apart at least 40 mm (the typical length of a saddle on a viola). In order to eliminate any gaps in the possible positions for the connecting bolt 102M along the bouts of the instrument when the clamping mechanism 102 is moved from a position straddling the saddle to a position on either side of it, the slot 102N must be made at least as long as the perpendicular distance between the upper clamp pieces 102A-102B. And the slot 102N is formed by raised pieces attached to the underside of the lower clamp piece 102G so that the surface of the lower clamp piece contacting the instrument 101 might be smooth. Because of its innovative design combining a sliding connecting bolt and two upper clamp pieces, the clamping mechanism 102 of this invention may be attached virtually anywhere along the lower bouts (large end) of the instrument 101.

Although the clamp parts of this invention permit multiple variations in their shapes, in general, the edges of the flat part of the lower clamp piece 102G will approximate the curve of the lower bouts of a violin or viola. The flange-like parts bearing the holes 102H-102J are angled slightly upward from the flat part of the lower piece 102G so that the heads of the screws 102K-102L when tightened upward against the flanges will cause the flat part of the lower piece to form a slightly acute angle with the long axis of the screws. Thus, the tightened clamp mechanism, if viewed in profile, shows that the paddle-like heads 102C-102D of the upper clamp pieces and the flat part of the lower clamp piece are angled slightly toward each other in order to better grip the raised edges of the instrument.

When the screws 102K-102L are fully tightened into the upper clamp pieces 102A-102B, the clamping mechanism 102 provides a strong connection to the instrument 101 and orients the long axis of the connecting bolt 102M (which is retained in the slot 102N) perpendicularly to the flat part of the lower clamp piece 102G. When the wearable support is disassembled, the clamping mechanism 102 may remain conveniently attached to the instrument because the bolt 102M is too short to interfere with storage in standard instrument cases.

Figure 2:
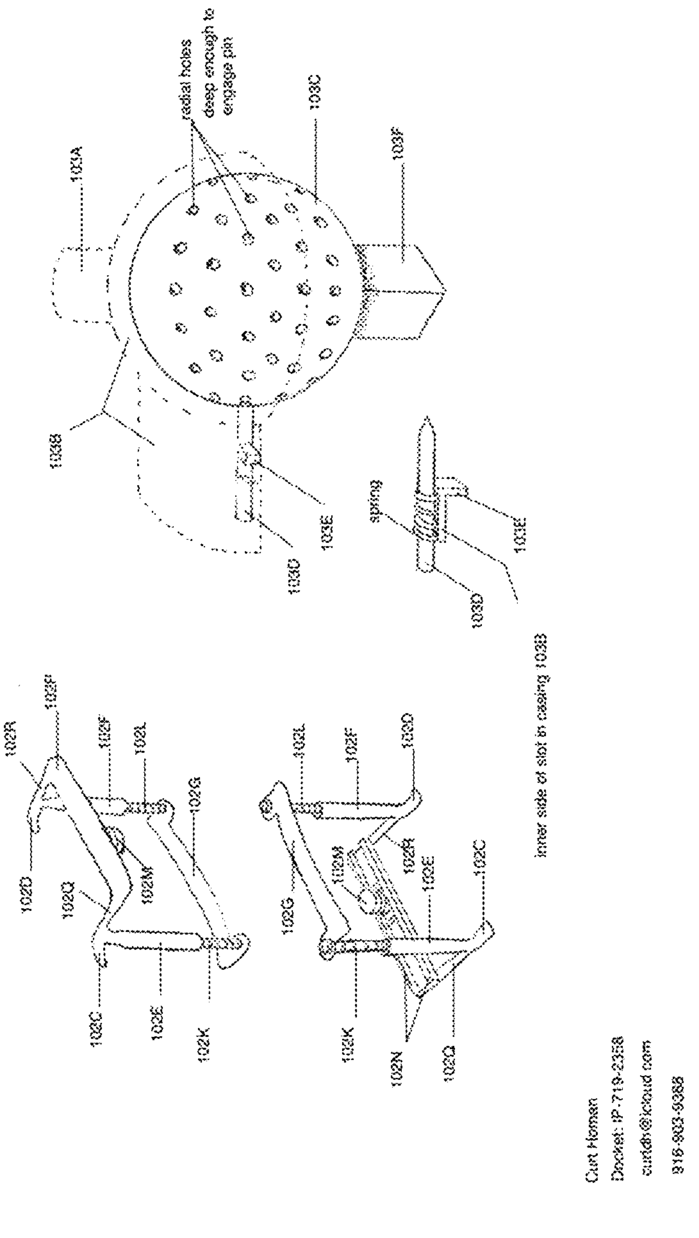
FIG. 2 illustrates one example embodiment of a clamping mechanism for this invention and an enlarged, cut-away view depicting the interior components of the described embodiment of this invention's orienting mechanism.

FIG. 2 depicts a variation of this invention's clamping mechanism 102 where the arms 102Q-102R of a bracket-shaped ([]) piece 102P are attached to the backs of the necks of the upper clamp pieces 102A-102B, "backs of the necks" referring to the obtuse-angled sides of the bends in the upper clamp pieces. The arms 102Q-102R are perpendicular to the long axis of the upper clamp pieces 102A-102B and the rectangular middle segment 102T of the piece 102P bears on its underside the slot 102N and the connecting bolt 102M. The arms 102Q-102R must be long enough to permit the orienting mechanism 103 and the support mechanism 104 to clear both the button (knob-like piece projecting form the end of a violin or viola) and the bottom edge of the instrument when the nut 103A of the orienting mechanism is attached to the bolt 102M. In this possible embodiment, when the nut 103A of the orienting mechanism 103 is screwed onto the connecting bolt 102M, the bolt's position near the upper edge of the instrument allows the instrument to sit in relation to the player's collar bone lower than when the bolt 102M protrudes from the underside of the lower clamp piece 102G. In other (not depicted) possible embodiments of this invention, the arms 102Q-102R (and thus the connecting bolt 102M) might move along slots in tubes fused lengthwise to the bodies 102E-102F of the upper clamp pieces 102A-102B, so varying the height of the instrument 101 relative to the collar bone of the player. An almost endless number of instrument heights relative to the collar bone might be achieved in other possible embodiments of this invention not only by moving the perpendicular arms 102Q-102R along the lengths of the bodies 102E-102F, but also by varying the dimensions of the components of the three mechanisms, particularly the connecting rods and/or sleeves.

The projection of the bracket-shaped piece 102P beyond the end of the instrument should be accommodated by most instrument cases, which have some leeway (extra space) in the length and height of their interiors. Or the piece 102P might be made to be removable, e.g., to slide onto pegs projecting perpendicularly from the obtuse angled sides of the necks of the upper clamp pieces 102A-102B. And of course, the surfaces of this invention's upper and lower clamp pieces that contact the instrument may be lined with an interfacial material (such as cork or felt) that permits good traction between the clamp piece and the instrument yet prevents the latter from being damaged by the mechanism 102.

The orienting mechanism 103 provides an adjustable platform angle at which the instrument will be held while playing it. The mechanism 103 includes six components: 1) a nut 103A (fused to the top of the casing 103B); the interior threads of the nut 103A are mated to the exterior threads of the bolt 102M of the clamping mechanism, permitting the two mechanisms to be firmly attached to each other; the length of the nut 103A slightly exceeds the length of that portion of the connecting bolt 102M that projects beyond the slot 102N so that the tightened nut 103A may hold the sliding bolt 102N in a fixed position along the slot; when the wearable support article 100 is disassembled, the nut 103A is unscrewed from the bolt 102, allowing the instrument to be stored in any standard case; 2) a casing or housing 103B (fused to the nut 103A) with a slightly more-than-hemispherical part and a similarly semi-cylindrical part; 3) a ball 103C (pierced by radial holes and retained by the hemispherical part of the casing 103B); 4) a spring-loaded pin 103D, housed in the casing 103B which preferably may be the semi-cylindrical (where any other shape may be possible), that engages the radial holes in the ball in order to lock the joint in various positions; the pin 103D is depicted in FIG. 2, in the cut-away view of the casing 103B; 5) a lever 103E that controls the spring-loaded pin 103D; and 6) a sleeve or hollow rod 103F that projects radially from the ball 103C.

The orienting mechanism 103 connects to the support mechanism 104 by means of a peg-and-hole method that allows the player to slide the orienting mechanism 103 on or off the support mechanism 104 at will during a performance. The peg-and-hole method permits that the sleeve or hollow rod 103F, which functions in the depicted embodiment as a "hole," be instead a "peg," and that the peg or rod 104F in the support mechanism 104, be instead a "hole." Thus, an embodiment of this invention is possible in which the functions of parts 103F and 104F are interchanged. When the wearable support article 100 is assembled, the instrument 101, the clamping mechanism 102, and the casing 103B function as a single unit whose weight is held by the pin in the radial holes of the ball.

Unless looking in a mirror, a player wearing the support mechanism 104 cannot see the orienting mechanism 103 when sliding it onto the support mechanism; so attaching the instrument during a performance must be accomplished by tactually guiding the orienting mechanism 103 into place onto the support mechanism 104. Through experimentation, the inventor has found that a rod is more easily guided into a tube than into a hole, the edges of the latter being difficult to discern with the fingers. Therefore, this invention uses a "sleeve" or "hollow rod" as the "hole" in the peg-and-hole connection between the orienting mechanism 103 and the support mechanism 104. Nevertheless, embodiments of this invention are possible in which the "hole" is merely that.

The conformations and functions of ball joints are commonly known, and the ball joint depicted in FIG. 2 is only one of many possible embodiments for this invention, as for example, those where the ball is held in place by a screw or by friction, rather than by a spring-loaded pin. Yet another example would be a joint that doesn't use a ball at all, such as a friction hinge.

The support mechanism 104 includes six components: 1) a loop 104A that is circular or elliptical and made of rigid wire, plastic, or some other material or materials strong enough to support the weight of a full-size violin or viola without allowing the instrument to droop or wobble; the thickness of the loop material and the length of the loop may vary depending, respectively, on the weight of the instrument (a viola being heavier than a violin) and the desired position for the end of the instrument; the loop 104A may be manufactured in different lengths or may, in an embodiment not depicted here, have opposing telescopic (extensible) segments that allow its length to be adjusted; the loop 104A may be covered with a some soft material such as velvet, but even without padding it is worn comfortably over the shirt and under the collar, and when thus worn is nearly invisible; the loop 104A is bisected and the halves are connected on one side by 2) a hinge 104B and on the other side by 3) a slotted tubular clasp 104C, which is permanently but movably attached to the loop by means of a tiny peg that is retained by a lateral slot in the tube, permitting the tube to rotate; the end of the other half of the loop 104A also bears a tiny peg that slides in and out of an L-shaped slot in the tubular clasp 104C, allowing the clasp to be locked or unlocked by simply rotating the tube in one direction or the other; 4) a medallion 104D with a lateral hole through which a straight portion of the loop 104A passes, allowing the medallion to rotate; 5) a screw 104E (or some other means of tightening not depicted here) holding the medallion 104D in a desired position relative to the loop 104A; and 6) a peg or rod 104F fused to, and projecting radially from, the medallion 104D.

Although the depicted medallion 104D is spherical, this invention permits that it not be a medallion, per se, but that it be any rotatable shape, such as a ring or sleeve, that bears a peg (or a hollow rod, as explained in [0026]). By rotating the loop 104A, the player may position the medallion 104D anywhere along the arc of the loop 104A, changing the plane of the loop from nearly vertical to nearly horizontal as the medallion is moved from directly in front of the player to over the shoulder. This planar shift requires that the medallion 104D be rotatable so that the peg 104F may be kept vertical to permit the sleeve 104F that slides onto it to be held in position by gravity. The position of the medallion 104D and thus the amount of its rotation required to keep the peg 104F vertical are pre-selected by the player. If the chosen position of the medallion is directly in front of the player, and the instrument is clamped in the center, and the length of the instrument is perpendicular to the musician's front side when playing, then neither the weight of the instrument nor the player's shifting up and down the fingerboard is likely to cause an undesirable lateral movement of the medallion or a turning of the loop 104A. But in all other chosen positions for the medallion 104D, the weight of the instrument will cause the medallion to shift its lowest point, turning and tilting the loop 104A as it does so. The tilting of the loop is largely contained by a shirt collar, but the medallion must be fixed in position to prevent it from shifting to its lowest point and turning the loop. This may be accomplished by a pin, a short string, a wire, a cloth strip with a buttonhole, etc. connecting the back of the medallion to the player's shirt, blouse, or some other equivalent article of clothing. And for those musicians whose attire is décolleté, a flesh-colored (and thus nearly invisible) string may be looped around the shoulder at the armpit and attached to the loop 104A. Any incarnation of this invention would include such connecting piece(s) as mentioned above, with attachment points on the medallion 104*d* and on the loop 104A, to be used at the player's discretion.

Even when not shifting along the fingerboard, the player's left hand and/or forearm move constantly, with the finger's contact point on the string as a pivot point, to generate vibrato, a tremulous or pulsating tonal effect created by minute and rapid variations in pitch. The wobbling of the instrument in response to the player's vibrato is suppressed by three things: the tethering pieces cited above, a snug peg-and-hole connection between this invention's orienting and support mechanisms (103 and 104) and the rigidity of the support loop 104A.

Example of an assembly process for the wearable support article 100 of this invention:

1) Attach the clamping mechanism 102 to the instrument 101.
2) Screw the nut 103A at the top of the orienting mechanism 103 onto the bolt 102M at the bottom of the clamping mechanism 102.
3) While pushing the lever 115E, adjust the hollow rod 103F to be perpendicular to the length of the instrument, then release the lever 115E to engage the pin 103D. Set the instrument (with the two mechanisms attached) aside.
4) Loosen the screw 104E in the medallion 104D.
5) Open the clasp 104C on the loop 104A, place the loop 104A around the neck and re-clasp it.
6) Pick up instrument 101 with the left hand and with the right hand guide the loose peg 104F into the hollow rod 103F, and holding the parts together, shift the instrument into the desired position; then, while holding the medallion and peg in place, lift the instrument with the left hand and set it down, still holding the medallion in place with the right hand.
7) Then using the provided connecting piece, attach the medallion 104D (still in the correct position) to clothing.
8) Tighten the screw 104E in the medallion 104D, making sure that the peg 104F is vertical.
9) Pick up the instrument with the left hand and with the right hand guide the hollow rod 103F onto the peg 104F.
10) With the right hand push the lever 103E on the casing 103B of the orienting mechanism 103 and while the lever is depressed use the left hand to adjust the instrument into the desired angle, then release the lever.

Once the player has experimented and found the desired position of the instrument, the assembly process above is greatly streamlined. For instance, once the clamping mechanism 102 is attached, it remains in place, and once the screw 104E is tightened, it need not be loosened again for subsequent uses. Similarly, although the angle of the instrument may be adjusted during rests in musical passages within a single performance, the orienting mechanism 103, once adjusted, may remain at a selected angle. So in practical application, given that the clamping mechanism remains affixed to the instrument and the loop 104A of the support mechanism 104 will have been attached by the player while dressing for a concert, the assembly of the wearable support article 100 of this invention at a performance venue will entail merely removing the instrument from the case, screwing on the orienting mechanism 103 (a task that will take no more time than attaching a shoulder rest), and sliding the orienting mechanism 103 onto the support mechanism 104.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

What is claimed is:

1. A wearable support device for providing hands-free support of an instrument comprising a viola and a violin; the wearable support device comprises:

a clamping mechanism comprising:

two upper clamp pieces, each with a paddle-like head that forms a slightly acute angle with a tubular and interiorly threaded body, a bend between a head and a body of an upper clamp piece being a neck and thus a back of the neck being an obtuse angle;

a lower clamp piece with a flat part whose edges approximate a curve of a lower end of the instrument;

a pair of flange-like parts, one on each side of the lower clamp piece, angled slightly upward from the flat part of the lower clamp piece;

a pair of holes, one in each of the flange-like parts;

a slot running a length of an underside of the lower clamp piece; and a bolt attached by a rectangular head in the slot;

a pair of screws that pass upward through the pair of holes of the lower clamp piece and have threads that are mated with interior threads of tubular bodies of the two upper clamp pieces, permitting the two screws to join the lower clamp piece to the upper clamp pieces;

an orienting mechanism comprising:

an attachment nut whose threads are mated to threads of a bolt on the underside of the lower clamp piece;

a casing fused to the attachment nut and composed of a slightly more than hemispherical part and a semi-cylindrical part;

a ball, more than half of which is housed in the more than hemispherical part of the casing;

a support mechanism comprising:

a rigid loop, fitted with a hinge and clasp, that is worn around a neck of a musician, permitting the wearable support to be worn by the musician playing the instrument;

a medallion through which the rigid loop passes allowing the medallion to rotate;

a retaining device that fixes the medallion in a selected position, preventing the medallion from rotating; and one or more attachment points on the medallion and the rigid loop that accommodate various means of connection to the musician.

2. The wearable support device according to claim 1, wherein the clamping mechanism comprises:

a bracket-shaped piece is connected by its ends to the backs of the necks of the upper clamp pieces, the length of the long segment of the bracket being the lateral distance between the connected necks of the upper clamp pieces;

a rectangular piece having a slot running a length of an underside surface;

a bolt retained by a rectangular head in the slot; and a lower clamp piece.

3. The wearable support device according to claim 2, wherein one or more parts of the clamping mechanism that come into contact with the instrument comprise an interfacial material enabling traction between the one or more parts of the clamping mechanism and the instrument protecting the instrument from damage by the clamping mechanism.

4. The wearable support device according to claim 2, wherein the orienting mechanism further comprises:

a ball being held in place by tightening the casing; and the casing comprises two parts:

an outer-threaded upper piece that houses the ball and has attached to its top side a nut that mates with the bolt in the clamping mechanism; and a lower piece with a central hole, the central hole having interior threads that mate to the exterior threads of the upper casing piece, and which the lower piece retains a swivel ball in the casing and fixes the swivel ball in place.

5. The wearable support device according to claim 1, wherein the orientating mechanism further comprises:

the ball being a radially perforated ball, more than half of which is housed in the more than hemispherical part of the casing;

a spring-loaded pin that engages a plurality of perforations in the radially perforated ball and is housed in the cylindrical part of the casing; and a lever on the cylindrical part of the casing controlling the spring-loaded pin; and a sleeve or hollow rod attached radially to the radially perforated ball and projecting away from the attachment nut.

6. The wearable support device according to claim 4, wherein the swivel ball is held in place by a screw.

7. The wearable support device according to claim 4, wherein the orienting mechanism utilizes an adjustable friction hinge for a joint.

8. The wearable support device according to claim 4, wherein a peg projects radially from the swivel ball.

9. The wearable support device according to claim 4, wherein the rigid loop is adjustable in its length by opposing segments that are telescopic.

10. The wearable support device according to claim 4, wherein the rigid loop comprises one of a plurality of lengths and thicknesses.

11. The wearable support device according to claim 4, wherein the rigid loop being irregularly shaped in order to prevent its rotation around the player's neck when bearing the weight of the instrument.

12. The wearable support device according to claim 4, wherein the support mechanism is made of material rigid enough to support the instrument yet shapeable to the contours of the musician's body.

13. The wearable support device according to claim 4, wherein the rigid loop is padded with cushioning material.

14. The wearable support device according to claim 4, wherein the medallion having a rotatable shape, the rotatable shape comprises a sleeve and ring.

15. The wearable support device according to claim 4, wherein the medallion further comprises a sleeve and hollow rod.

* * * * *